United States Patent
Chen et al.

(10) Patent No.: US 10,224,855 B2
(45) Date of Patent: *Mar. 5, 2019

(54) THREE-PHASE SWITCHED RELUCTANCE MOTOR TORQUE RIPPLE THREE-LEVEL SUPPRESSION METHOD

(71) Applicant: CHINA UNIVERSITY OF MINING AND TECHNOLOGY, Xuzhou, Jiangsu (CN)

(72) Inventors: Hao Chen, Xuzhou (CN); Jiaotong Shi, Xuzhou (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/128,947

(22) PCT Filed: Jul. 31, 2015

(86) PCT No.: PCT/CN2015/085651
§ 371 (c)(1),
(2) Date: Sep. 23, 2016

(87) PCT Pub. No.: WO2016/029777
PCT Pub. Date: Mar. 3, 2016

(65) Prior Publication Data
US 2017/0279396 A1 Sep. 28, 2017

(30) Foreign Application Priority Data

Aug. 27, 2014 (CN) .......................... 2014 1 0431988

(51) Int. Cl.
*H02P 25/098* (2016.01)
*H02P 6/10* (2006.01)

(52) U.S. Cl.
CPC .............. *H02P 25/098* (2016.02); *H02P 6/10* (2013.01)

(58) Field of Classification Search
CPC .......... H02P 6/10; H02P 25/098; H02P 25/08; H02P 2205/05; H02P 25/089; B60L 2220/18
See application file for complete search history.

(56) References Cited

U.S. PATENT DOCUMENTS 5,780,986 A * 7/1998 Shelton ................... G05B 11/28
318/400.11
5,998,952 A * 12/1999 McLaughlin ......... H02P 25/098
318/432

(Continued)

FOREIGN PATENT DOCUMENTS

CN 101562387 A 10/2009
CN 103078570 A 5/2013

(Continued)

OTHER PUBLICATIONS

PCT/CN2015/085651, International Search Report, dated Oct. 29, 2015, State Intellectual Property Office of the P.R. China.

*Primary Examiner* — Thai Dinh
(74) *Attorney, Agent, or Firm* — Millman IP Inc.

(57) ABSTRACT

A three-phase switched reluctance motor torque ripple three-level suppression method. A first set of torque thresholds ($th1_{low}$, $th1_{zero}$, $th1_{up}$) is set in rotor position interval [0°, $\theta_r/3$]. A second set of torque thresholds ($th2_{low}$, $th2_{zero}$, $th2_{up}$) is set in rotor position interval [$\theta_r/3$, $\theta_r/2$]. Power is supplied to adjacent phase A and phase B for excitation. The power supplied for excitation to phase A leads the power supplied for excitation to phase B by $\theta_r/3$. At this moment, phase A is turned off, phase B is turned on and three-level suppression of torque ripple of three-phase switched reluctance motor is realized by dividing the commutation process from phase A to phase B into two sections.

2 Claims, 1 Drawing Sheet

(56) References Cited

U.S. PATENT DOCUMENTS

| | | | | |
|---|---|---|---|---|
| 6,002,226 A | * | 12/1999 | Collier-Hallman | H02P 6/10 |
| | | | | 318/139 |
| 6,448,724 B1 | * | 9/2002 | Kleinau | B62D 5/046 |
| | | | | 318/139 |
| 6,559,617 B2 | * | 5/2003 | Kim | H02P 25/098 |
| | | | | 318/432 |
| 7,518,330 B2 | * | 4/2009 | Lin | H02P 6/08 |
| | | | | 318/434 |
| 8,138,712 B2 | * | 3/2012 | Yamada | H02M 1/12 |
| | | | | 318/400.01 |
| 8,544,580 B2 | * | 10/2013 | Cheng | H02P 25/08 |
| | | | | 180/65.51 |
| 2015/0318806 A1 | * | 11/2015 | Wai | H02P 25/098 |
| | | | | 318/400.23 |
| 2016/0190967 A1 | * | 6/2016 | Takano | H02P 25/086 |
| | | | | 318/254.1 |

FOREIGN PATENT DOCUMENTS

| | | |
|---|---|---|
| CN | 103684117 A | 3/2014 |
| CN | 103888045 A | 6/2014 |
| CN | 104300846 A | 1/2015 |
| JP | 2014068499 A | 4/2014 |
| KR | 1020140073395 A | 6/2014 |

* cited by examiner

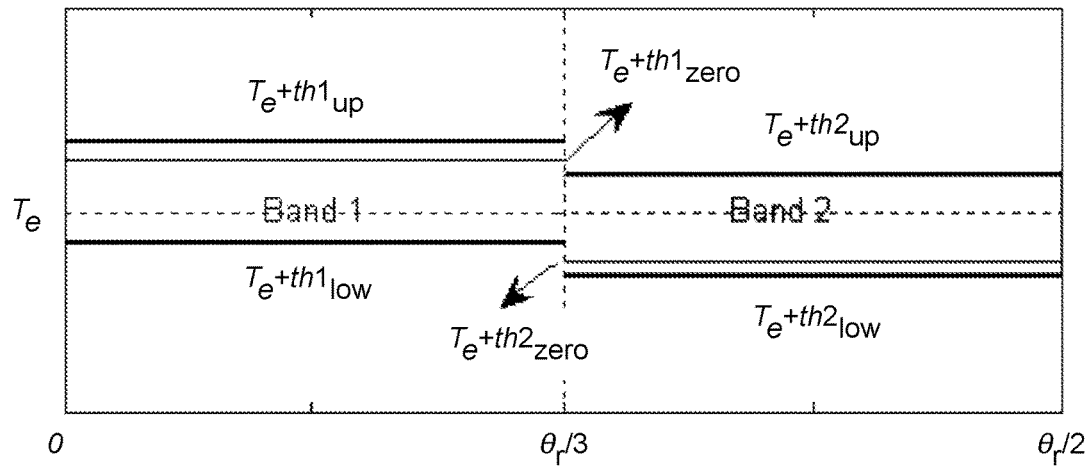
Figure 1
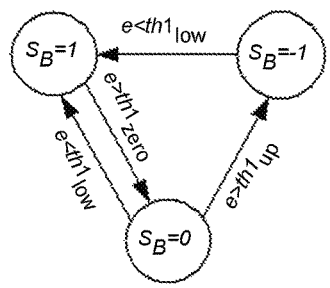 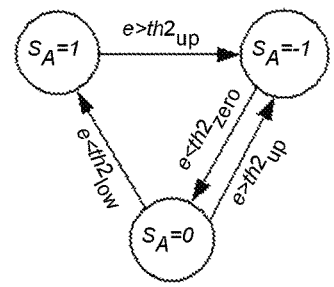
Figure 2(a)      Figure 2(b)
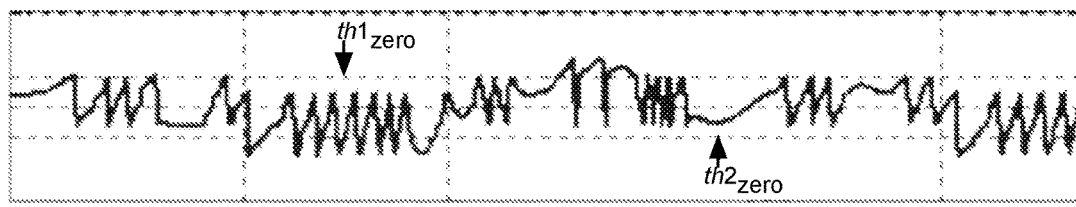
Figure 3

THREE-PHASE SWITCHED RELUCTANCE MOTOR TORQUE RIPPLE THREE-LEVEL SUPPRESSION METHOD

FIELD OF THE INVENTION

The present invention relates to a three-phase switched reluctance motor torque ripple three-level suppression method, and is particularly suitable for a three-phase switched reluctance motor drive system.

BACKGROUND OF THE INVENTION

Switched reluctance motor attracts great attention owing to its simple and firm structure, low manufacturing cost and desirable speed control performance. However, its special double salient pole structure and switch-type exciting mode make its output electromagnetic torque have large pulsation, seriously restricting the application in its fields. For this reason, researchers put forth various methods to eliminate torque pulsation and meanwhile realize minimum copper loss. These methods generate a good effect in a specific range of speed. Nevertheless, when the rotational speed is high, due to limited DC supply voltage, the ability of the system to control and track expected current, expected flux linkage and expected torque is weakened and it is difficult to effectively eliminate torque pulsation. Furthermore, due to the limitation of maximum endurable current of winding and the volt-ampere (VA) rating of semiconductor devices, switched reluctance motor system has an upper limit of current and due to the limitation of current, the switched reluctance motor only can output smooth torque in a limited range. Therefore, all the controls over output of smooth torques have a specific operable range.

SUMMARY OF THE INVENTION

Technical Problem

The object of the present invention is to overcome the problem in the prior art and provide a three-phase switched reluctance motor torque ripple three-level suppression method.

Technical Scheme

The present invention provides a three-phase switched reluctance motor torque ripple three-level suppression method, comprising the following steps:

a. Setting a first group of torque threshold values ($th1_{low}$, $th1_{zero}$, $th1_{up}$) in rotor position interval [0°, $\theta_r/3$], and a second group of torque threshold values ($th2_{low}$, $th2_{zero}$, $th2_{up}$) in rotor position interval [$\theta_r/3$, $\theta_r/2$], wherein these six torque threshold values meet the following conditions:

$$th1_{up} > th1_{zero} > th2_{up} > 0 \quad (1)$$

$$0 > th1_{low} > th2_{zero} > th2_{low} \quad (2)$$

$$|th1_{zero}| = |th2_{zero}| \quad (3)$$

$$|th1_{up}| = |th2_{low}| \quad (4)$$

$$|th2_{up}| = |th1_{low}| \quad (5)$$

wherein, rotor position 0° is minimum phase inductance position, rotor position $\theta_r$ is angular pitch, i.e., one rotor cycle, and a half rotor cycle is $\theta_r/2$;

b. Setting excited state $S_A$ as excited state of phase A power supply, wherein excited state $S_A=1$ indicates that phase A exciting voltage is positive, excited state $S_A=0$ indicates that phase A exciting voltage is zero, and excited state $S_A=-1$ indicates that phase A exciting voltage is negative; setting excited state $S_B$ as excited state of phase B power supply, wherein excited state $S_B=1$ indicates that phase B exciting voltage is positive, excited state $S_B=0$ indicates that phase B exciting voltage is zero and excited state $S_B=-1$ indicates that phase B exciting voltage is negative, and the expected total smooth torque is $T_e$;

c. For adjacent phase A and phase B power supply excitations, phase A power supply excitation is $\theta_r/3$ ahead of phase B power supply excitation. At this moment, phase A is turned off, phase B is turned on and three-level suppression of torque ripple of three-phase switched reluctance motor is realized by dividing the commutation process from phase A to phase B into two sections.

The commutation process from phase A to phase B is divided into two sections as follows:

(1) In rotor position interval [0°, $\theta_1$], phase A uses the second group of torque threshold values ($th2_{low}$, $th2_{zero}$, $th2_{up}$), phase B uses the first group of torque threshold values ($th1_{low}$, $th1_{zero}$, $th1_{up}$), critical position $\theta_1$ appears automatically in the commutation process, and no extra calculation is needed;

(1.1) Phase B breakover cycle is started in rotor position 0°, initial excited state $S_B=1$ is set, and phase B current and torque increase from 0; excited state $S_A$ maintains original state $S_A=1$, and phase A current and torque increase. Total torque increases;

(1.2) When total torque increases to torque value $T_e+th2_{up}$, excited state $S_A$ is converted from 1 to −1, and phase A torque decreases; phase B maintains original state, and phase B torque continues to increase. As phase B inductance change rate and phase current are small at this moment, the increase rate of phase B torque is smaller than the decrease rate of phase A torque, the change trend of total torque is decided by phase A, and total torque decreases;

(1.3) When total torque first decreases to torque value $T_e+th1_{low}$, phase A and phase B state transfer conditions are not met, excited states $S_A$ and $S_B$ maintain original states and total torque continues to decrease;

(1.4) When total torque decreases to torque value $T_e+th2_{zero}$, conversion of phase A state from excited state $S_A=-1$ to excited state $S_A=0$ is triggered, and phase A torque decreases, but the decrease rate is smaller than that when excited state $S_A=-1$; phase B maintains original excited state and torque continues to increase. At this moment, under the condition of excited state $S_A=0$ and excited state $S_B=1$, the decrease rate of phase A torque is larger than the increase rate of phase B torque, and total torque decreases;

(1.5) When total torque decreases to torque value $T_e+th2_{low}$, phase A state transfer conditions are met, phase A state is converted from excited state $S_A=0$ to excited state $S_A=1$ and phase A torque increases; phase B maintains original state and torque continues to increase; total torque increases;

(1.6) When total torque increases to torque value $T_e+th2_{zero}$ and $T_e+th1_{low}$ in turn, phase A and phase B state transfer conditions are not met in both cases, and total torque continues to increase;

(1.7) When total torque increases to torque value $T_e+th2_{up}$, steps (1.2)~(1.6) are repeated, and phase B state is not triggered and changed and maintains excited state $S_B=1$; phase A excited state is switched among 1, 0 and −1, and total torque is controlled in [$T_e+th2_{low}$, $T_e+th2_{up}$], thereby inhibiting ripple of three-phase switched reluctance motor torque in rotor position interval [0°, $\theta_1$];

(1.8) With the increase of rotor position, phase B inductance change rate and current increase to a specific level. After a specific critical position is reached, when excited state $S_A=0$ and excited state $S_B=1$, the decrease rate of phase A torque is smaller than the increase rate of phase B torque and total torque increases;

(2) In rotor position interval [$\theta_1$, $\theta_r/3$], phase A continues to use the second group of torque threshold values (th2$_{low}$, th2$_{zero}$, th2$_{up}$) and phase B continues to use the first group of torque threshold values (th1$_{low}$, th1$_{zero}$, th1$_{up}$);

(2.1) In rotor position $\theta_1$, total torque reaches torque value $T_e+th2_{up}$ and phase A state is switched to excited state $S_A=-1$; phase B maintains excited state $S_B=1$, and in this position the decrease rate of phase A torque under the excitation of negative supply voltage is larger than the increase rate of phase B torque under the excitation of positive supply voltage, so total torque decreases. However, this situation is changed subsequently. Following the increase of rotor position, although the excited states of phase A and phase B both remain unchanged, the torque decrease rate of phase A in excited state $S_A=-1$ is smaller than the torque increase rate of phase B in excited state $S_B=1$, thereby total torque increases;

(2.2) When total torque increases to torque value $T_e+th2_{up}$, neither excited state $S_A$ nor excited state $S_B$ is triggered and changed, and total torque continues to increase;

(2.3) When total torque reaches torque value $T_e+th1_{zero}$, phase B state transfer conditions are met, excited state $S_B$ is converted into 0 and phase B torque decreases; phase A maintains original excited state $S_A=-1$ and total torque decreases;

(2.4) When total torque decreases to torque value $T_e+th2_{up}$, neither excited state $S_A$ nor excited state $S_B$ is triggered and changed, and total torque continues to decrease;

(2.5) When total torque decreases to torque value $T_e+th1_{low}$, phase B state transfer conditions are met, excited state $S_B$ is converted into 1 and phase B torque increases; phase A maintains original excited state $S_A=-1$ and total torque increases;

(2.6) Steps (2.2)~(2.5) are repeated, excited state $S_A$ remains to be −1 and phase A torque and current continue to decrease; excited state $S_B$ is switched between 0 and 1, and total torque is controlled in [$T_e+th1_{low}$, $T_e+th1_{zero}$], thereby inhibiting ripple of three-phase switched reluctance motor torque in rotor position interval [$\theta_1$, $\theta_r/3$];

(2.7) When the rotor is in a critical position, phase B torque increases in excited state $S_B=0$, and the increase rate is larger than the phase A torque decrease rate in excited state $S_A=-1$. At this moment, total torque increases;

(2.8) When total torque increases to torque value $T_e+th1_{up}$, phase B state is triggered and changed, excited state $S_B$ is converted from 0 to −1 and phase B torque decreases; phase A torque continues to decrease and total torque decreases;

(2.9) When total torque decreases to torque value $T_e+th1_{zero}$ and torque value $T_e+th2_{up}$ in turn, neither excited state $S_A$ nor excited state $S_B$ is triggered and changed, and total torque continues to decrease;

(2.10) When total torque decreases to torque value $T_e+th1_{low}$, excited state $S_B$ is triggered and changed into 1 and phase B torque increases; phase A maintains original state, phase A torque continues to decrease and total torque increases;

(2.11) When total torque increases to torque value $T_e+th1_{zero}$, excited state $S_B$ is triggered and changed into 0 and excited state $S_A$ remains to be −1. The situation at this moment is the same as that of (2.7). Steps (2.7)~(2.11) are repeated, excited state $S_A$ remains to be −1, excited state $S_B$ is switched among −1, 0 and 1, and total torque is controlled in [$T_e+th1_{low}$, $T_e+th1_{up}$], thereby inhibiting the ripple of three-phase switched reluctance motor torque in rotor position interval [$\theta_1$, $\theta_r/3$];

(2.12) When the rotor is in a critical position and phase B torque is in excited state $S_B=0$ and excited state $S_A=-1$, total torque no longer increases but decreases. (2.2)~(2.5) are repeated from this moment and total torque is controlled in [$T_e+th1_{low}$, $T_e+th1_{zero}$], thereby inhibiting ripple of three-phase switched reluctance motor torque in rotor position interval [$\theta_1$, $\theta_r/3$].

Beneficial effect: Due to adoption of the foregoing technical scheme, by setting two groups of torque threshold values and adjacent phase A and phase B excited states, the present invention makes phase A and phase B switch among three excited states in which power supply exciting voltage is positive, zero and negative respectively, controls total torque between the two groups of torque threshold values, inhibits ripple of three-phase switched reluctance motor torque and realizes smooth control of direct and transient torque of three-phase switched reluctance motor. The waveform of the exciting voltage the motor winding receives and the waveform of expected voltage have the same features. The actual phase current is highly identical to expected phase current so that switched reluctance motor outputs smooth torque in a maximum range. The present invention has high universality, a desirable practical effect and a broad application prospect and is applicable to various types of three-phase switched reluctance motor drive systems with various structures.

BRIEF DESCRIPTION OF THE DRAWINGS

FIG. 1 is a schematic diagram for setting of three-level torque threshold values of switched reluctance motor provided by the present invention;

FIG. 2(a) is a schematic diagram for conversion of excited state of phase B power supply of switched reluctance motor provided by the present invention;

FIG. 2(b) is a schematic diagram for conversion of excited state of phase A power supply of switched reluctance motor provided by the present invention;

FIG. 3 is torque waveform of switched reluctance motor provided by the present invention.

EMBODIMENTS

The present invention is further described below in connection with the examples shown in accompanying drawings:

As shown in FIG. 1, for one three-phase switched reluctance motor, the detailed steps are as follows:

a. Setting a first group of torque threshold values (th1$_{low}$, th1$_{zero}$, th1$_{up}$) in rotor position interval [0°, θ$_r$/3], and a second group of torque threshold values (th2$_{low}$, th2$_{zero}$, th2$_{up}$) in rotor position interval [θ$_r$/3, θ$_r$/2], wherein these six torque threshold values meet the following conditions:

$$th1_{up} > th1_{zero} > th2_{up} > 0 \quad (1)$$

$$0 > th1_{low} > th2_{zero} > th2_{low} \quad (2)$$

$$|th1_{zero}| = |th2_{zero}| \quad (3)$$

$$|th1_{up}| = |th2_{low}| \quad (4)$$

$$|th2_{up}| = |th1_{low}| \quad (5)$$

wherein, rotor position 0° is minimum phase inductance position, rotor position θ$_r$ is angular pitch, i.e., one rotor cycle, and a half rotor cycle is θ$_r$/2;

b. As shown in FIGS. 2(a, b), setting excited state S$_A$ as excited state of phase A power supply, wherein excited state S$_A$=1 indicates that phase A exciting voltage is positive, excited state S$_A$=0 indicates that phase A exciting voltage is zero, and excited state S$_A$=−1 indicates that phase A exciting voltage is negative; setting excited state S$_B$ as excited state of phase B power supply, wherein excited state S$_B$=1 indicates that phase B exciting voltage is positive, excited state S$_B$=0 indicates that phase B exciting voltage is zero and excited state S$_B$=−1 indicates that phase B exciting voltage is negative, and the expected total smooth torque is T$_e$.

c. For adjacent phase A and phase B power supply excitations, phase A power supply excitation is θ$_r$/3 ahead of phase B power supply excitation. At this moment, phase A is turned off, phase B is turned on and three-level suppression of torque ripple of three-phase switched reluctance motor is realized by dividing the commutation process from phase A to phase B into two sections, as shown in FIG. 1.

The commutation process from phase A to phase B is divided into two sections as follows:

(1) In rotor position interval [0°, θ$_1$], phase A uses the second group of torque threshold values (th2$_{low}$, th2$_{zero}$, th2$_{up}$), phase B uses the first group of torque threshold values (th1$_{low}$, th1$_{zero}$, th1$_{up}$), critical position θ$_1$ appears automatically in the commutation process, and no extra calculation is needed;

(1.1) Phase B breakover cycle is started in rotor position 0°, initial excited state SB=1 is set, and phase B current and torque increase from 0; excited state SA maintains original state SA=1, and phase A current and torque increase. Total torque increases;

(1.2) When total torque increases to torque value Te+th2up, excited state SA is converted from 1 to −1, and phase A torque decreases; phase B maintains original state, and phase B torque continues to increase. As phase B inductance change rate and phase current are small at this moment, the increase rate of phase B torque is smaller than the decrease rate of phase A torque, the change trend of total torque is decided by phase A, and total torque decreases;

(1.3) When total torque first decreases to torque value Te+th1low, phase A and phase B state transfer conditions are not met, excited states SA and SB maintain original states and total torque continues to decrease;

(1.4) When total torque decreases to torque value Te+th2zero, conversion of phase A state from excited state SA=−1 to excited state SA=0 is triggered, and phase A torque decreases, but the decrease rate is smaller than that when excited state SA=−1; phase B maintains original excited state and torque continues to increase. At this moment, under the condition of excited state SA=0 and excited state SB=1, the decrease rate of phase A torque is larger than the increase rate of phase B torque, and total torque decreases;

(1.5) When total torque decreases to torque value Te+th2low, phase A state transfer conditions are met, phase A state is converted from excited state SA=0 to excited state SA=1 and phase A torque increases; phase B maintains original state and torque continues to increase; total torque increases;

(1.6) When total torque increases to torque value Te+th2zero and Te+th1low in turn, phase A and phase B state transfer conditions are not met in both cases, and total torque continues to increase;

(1.7) When total torque increases to torque value Te+th2up, steps (1.2)~(1.6) are repeated, and phase B state is not triggered and changed and maintains excited state SB=1; phase A excited state is switched among 1, 0 and −1, and total torque is controlled in [Te+th2low, Te+th2up], thereby inhibiting ripple of three-phase switched reluctance motor torque in rotor position interval [0°, θ1];

(1.8) With the increase of rotor position, phase B inductance change rate and current increase to a specific level. After a specific critical position is reached, when excited state SA=0 and excited state SB=1, the decrease rate of phase A torque is smaller than the increase rate of phase B torque and total torque increases;

(2) In rotor position interval [θ$_1$, θ$_r$/3], phase A continues to use the second group of torque threshold values (th2$_{low}$, th2$_{zero}$, th2$_{up}$) and phase B continues to use the first group of torque threshold values (th1$_{low}$, th1$_{zero}$, th1$_{up}$);

(2.1) In rotor position θ$_1$, total torque reaches torque value T$_e$+th2$_{up}$ and phase A state is switched to excited state S$_A$=−1; phase B maintains excited state S$_B$=1, and in this position the decrease rate of phase A torque under the excitation of negative supply voltage is larger than the increase rate of phase B torque under the excitation of positive supply voltage, so total torque decreases. However, this situation is changed subsequently. Following the increase of rotor position, although the excited states of phase A and phase B both remain unchanged, the torque decrease rate of phase A in excited state S$_A$=−1 is smaller than the torque increase rate of phase B in excited state S$_B$=1, thereby total torque increases;

(2.2) When total torque increases to torque value T$_e$+th2$_{up}$, neither excited state S$_A$ nor excited state S$_B$ is triggered and changed, and total torque continues to increase;

(2.3) When total torque reaches torque value T$_e$+th1$_{zero}$, phase B state transfer conditions are met, excited state S$_B$ is converted into 0 and phase B torque decreases; phase A maintains original excited state S$_A$=−1 and total torque decreases;

(2.4) When total torque decreases to torque value T$_e$+th2$_{up}$, neither excited state S$_A$ nor excited state S$_B$ is triggered and changed, and total torque continues to decrease;

(2.5) When total torque decreases to torque value T$_e$+th1$_{low}$, phase B state transfer conditions are met, excited state S$_B$ is converted into 1 and phase B torque increases; phase A maintains original excited state $S_A=-1$ and total torque increases;

(2.6) Steps (2.2)~(2.5) are repeated, excited state $S_A$ remains to be −1 and phase A torque and current continue to decrease; excited state $S_B$ is switched between 0 and 1, and total torque is controlled in $[T_e+th1_{low}, T_e+th1_{zero}]$, thereby inhibiting ripple of three-phase switched reluctance motor torque in rotor position interval $[\theta_1, \theta_r/3]$;

(2.7) When the rotor is in a critical position, phase B torque increases in excited state $S_B=0$, and the increase rate is larger than the phase A torque decrease rate in excited state $S_A=-1$. At this moment, total torque increases;

(2.8) When total torque increases to torque value $T_e+th1_{up}$, phase B state is triggered and changed, excited state $S_B$ is converted from 0 to −1 and phase B torque decreases; phase A torque continues to decrease and total torque decreases;

(2.9) When total torque decreases to torque value $T_e+th1_{zero}$ and torque value $T_e+th2_{up}$ in turn, neither excited state $S_A$ nor excited state $S_B$ is triggered and changed, and total torque continues to decrease;

(2.10) When total torque decreases to torque value $T_e+th1_{low}$, excited state $S_B$ is triggered and changed into 1 and phase B torque increases; phase A maintains original state, phase A torque continues to decrease and total torque increases;

(2.11) When total torque increases to torque value $T_e+th1_{zero}$, excited state $S_B$ is triggered and changed into 0 and excited state $S_A$ remains to be −1. The situation at this moment is the same as that of (2.7). Steps (2.7)~(2.11) are repeated, excited state $S_A$ remains to be −1, excited state $S_B$ is switched among −1, 0 and 1, and total torque is controlled in $[T_e+th1_{low}, T_e+th1_{up}]$, thereby inhibiting the ripple of three-phase switched reluctance motor torque in rotor position interval $[\theta_1, \theta_r/3]$;

(2.12) When the rotor is in a critical position and phase B torque is in excited state $S_B=0$ and excited state $S_A=-1$, total torque no longer increases but decreases. (2.2)~(2.5) are repeated from this moment and total torque is controlled in $[T_e+th1_{low}, T_e+th1_{zero}]$, thereby inhibiting ripple of three-phase switched reluctance motor torque in rotor position interval $[\theta_1, \theta_r/3]$.

For adjacent phase B and phase C power supply excitations, when phase B power supply excitation is $\theta_r/3$ ahead of phase C power supply excitation, torque threshold value setting, commutation process, and phase B and phase C excited state switch and transfer methods are similar to the foregoing circumstance.

For adjacent phase C and phase A power supply excitations, when phase C power supply excitation is $\theta_r/3$ ahead of phase A power supply excitation, torque threshold value setting, commutation process, and phase C and phase A excited state switch and transfer methods are similar to the foregoing circumstance.

The acquired switched reluctance motor torque waveform is as shown in FIG. 3.

The invention claimed is:

1. A three-phase switched reluctance motor torque ripple three-level suppression method, wherein:
   a. setting a first group of torque threshold values ($th1_{low}$, $th1_{zero}$, $th1_{up}$) in rotor position interval $[0°, \theta r/3]$, and a second group of torque threshold values ($th2_{low}$, $th2_{zero}$, $th2_{up}$) in rotor position interval $[\theta_r/3, \theta_r/2]$, wherein these six torque threshold values meet the following conditions:

$$th1_{up} > th1_{zero} > th2_{up} > 0 \quad (1)$$

$$0 > th1_{low} > th2_{zero} > th2_{low} \quad (2)$$

$$|th1_{zero}| = |th2_{zero}| \quad (3)$$

$$|th1_{up}| = |th2_{low}| \quad (4)$$

$$|th2_{up}| = |th1_{low}| \quad (5)$$

wherein rotor position 0° is minimum phase inductance position, rotor position $\theta_r$ is angular pitch of one rotor cycle, and a half rotor cycle is $\theta r/2$;

b. setting excited state $S_A$ as excited state of phase A power supply, wherein excited state $S_A=1$ indicates that phase A exciting voltage is positive, excited state $S_A=0$ indicates that phase A exciting voltage is zero, and excited state $S_A=-1$ indicates that phase A exciting voltage is negative; setting excited state $S_B$ as excited state of phase B power supply, wherein excited state $S_B=1$ indicates that phase B exciting voltage is positive, excited state $S_B=0$ indicates that phase B exciting voltage is zero and excited state $S_B=-1$ indicates that phase B exciting voltage is negative, and the expected total smooth torque is $T_e$;

c. for adjacent phase A and phase B power supply excitations, phase A power supply excitation is $\theta_r/3$ ahead of phase B power supply excitation; at this moment, phase A is turned off, phase B is turned on and three-level suppression of torque ripple of three-phase switched reluctance motor is realized by dividing the commutation process from phase A to phase B into two sections.

2. The three-phase switched reluctance motor torque ripple three-level suppression method according to claim 1, wherein the commutation process from phase A to phase B is divided into two sections:

(1) in rotor position interval $[0°, \theta1]$, phase A uses the second group of torque threshold values (th2low, th2zero, th2up), phase B uses the first group of torque threshold values (th1low, th1zero, th1up), critical position θ1 appears automatically in the commutation process, and no extra calculation is needed:

(1.1) phase B breakover cycle is started in rotor position 0°, initial excited state $S_B=1$ is set, and phase B current and torque increase from 0; excited state $S_A$ maintains original state $S_A=1$, and phase A current and torque increase and total torque increases;

(1.2) when total torque increases to torque value $T_e+th2_{up}$, excited state $S_A$ is converted from 1 to −1, and phase A torque decreases; phase B maintains original state, and phase B torque continues to increase; as phase B inductance change rate and phase current are small at this moment, an increase rate of phase B torque is smaller than a decrease rate of phase A torque, the change trend of total torque is decided by phase A, and total torque decreases;

(1.3) when total torque first decreases to torque value $T_e+th1_{low}$, phase A and phase B state transfer conditions are not met, excited states $S_A$ and $S_B$ maintain original states and total torque continues to decrease;

(1.4) when total torque decreases to torque value $T_e+th2_{zero}$, conversion of phase A state from excited state $S_A=-1$ to excited state $S_A=0$ is triggered, and phase A torque decreases, but the decrease rate of phase A is smaller than that when excited state $S_A=-1$; phase B maintains original excited state and phase B torque continues to increase; at this moment, under the condition of excited state $S_A=0$ and excited state $S_B=1$, the decrease rate of phase A torque is larger than the increase rate of phase B torque, and total torque decreases;

(1.5) when total torque decreases to torque value $T_e+th2_{low}$, phase A state transfer conditions are met, phase A state is converted from excited state $S_A=0$ to excited state $S_A=1$ and phase A torque increases; phase B maintains original state and phase B torque continues to increase; total torque increases;

(1.6) when total torque increases to torque value $T_e+th2_{zero}$ and $T_e+th1_{low}$ in turn, phase A and phase B state transfer conditions are not met in both cases, and total torque continues to increase;

(1.7) when total torque increases to torque value $T_e+th2_{up}$, steps (1.2)~(1.6) are repeated, and phase B state is not triggered and changed and maintains excited state $S_B=1$; phase A excited state is switched among 1, 0 and −1, and total torque is controlled in $[T_e+th2_{low}, T_e+th2_{up}]$, thereby inhibiting ripple of three-phase switched reluctance motor torque in rotor position interval $[0°, \theta_1]$;

(1.8) with the increase of rotor position, phase B inductance change rate and current increase to a specific level; after a specific critical position is reached, when excited state $S_A=0$ and excited state $S_B=1$, the decrease rate of phase A torque is smaller than the increase rate of phase B torque and total torque increases;

(2) in rotor position interval $[\theta_1, \theta r/3]$, phase A continues to use the second group of torque threshold values $(th2_{low}, th2_{zero}, th2_{up})$ and phase B continues to use the first group of torque threshold values $(th1_{low}, th1_{zero}, th1_{up})$;

(2.1) in rotor position $\theta_1$, total torque reaches torque value $T_e+th2_{up}$ and phase A state is switched to excited state $S_A=-1$; phase B maintains excited state $S_B=1$, and in this position the decrease rate of phase A torque under the excitation of negative supply voltage is larger than the increase rate of phase B torque under the excitation of positive supply voltage, so total torque decreases; however, this situation is changed subsequently; following the increase of rotor position, although the excited states of phase A and phase B both remain unchanged, the torque decrease rate of phase A in excited state $S_A=-1$ is smaller than the torque increase rate of phase B in excited state $S_B=1$, thereby total torque increases;

(2.2) when total torque increases to torque value $T_e+th2_{up}$, neither excited state $S_A$ nor excited state $S_B$ is triggered and changed, and total torque continues to increase;

(2.3) when total torque reaches torque value $T_e+th1_{zero}$, phase B state transfer conditions are met, excited state $S_B$ is converted into 0 and phase B torque decreases; phase A maintains original excited state $S_A=-1$ and total torque decreases;

(2.4) when total torque decreases to torque value $T_e+th2_{up}$, neither excited state $S_A$ nor excited state $S_B$ is triggered and changed, and total torque continues to decrease;

(2.5) when total torque decreases to torque value $T_e+th1_{low}$, phase B state transfer conditions are met, excited state $S_B$ is converted into 1 and phase B torque increases; phase A maintains original excited state $S_A=-1$ and total torque increases;

(2.6) steps (2.2)~(2.5) are repeated, excited state $S_A$ remains to be −1 and phase A torque and current continue to decrease; excited state $S_B$ is switched between 0 and 1, and total torque is controlled in $[T_e+th1_{low}, T_e+th1_{zero}]$, thereby inhibiting ripple of three-phase switched reluctance motor torque in rotor position interval $[\theta_1, \theta_r/3]$;

(2.7) when the rotor is in a critical position, phase B torque increases in excited state $S_B=0$, and the increase rate of phase B torque is larger than the phase A torque decrease rate in excited state $S_A=-1$; at this moment, total torque increases;

(2.8) when total torque increases to torque value $T_e+th1_{up}$, phase B state is triggered and changed, excited state $S_B$ is converted from 0 to −1 and phase B torque decreases; phase A torque continues to decrease and total torque decreases;

(2.9) when total torque decreases to torque value $T_e+th1_{zero}$ and torque value $T_e+th2_{up}$ in turn, neither excited state $S_A$ nor excited state $S_B$ is triggered and changed, and total torque continues to decrease;

(2.10) when total torque decreases to torque value $T_e+th1_{low}$, excited state $S_B$ is triggered and changed into 1 and phase B torque increases; phase A maintains original state, phase A torque continues to decrease and total torque increases;

(2.11) when total torque increases to torque value $T_e+th1_{zero}$, excited state $S_B$ is triggered and changed into 0 and excited state $S_A$ remains to be −1; the situation at this moment is the same as that of (2.7); steps (2.7)~(2.11) are repeated, excited state $S_A$ remains to be −1, excited state $S_B$ is switched among −1, 0 and 1, and total torque is controlled in $[T_e+th1_{low}, T_e+th1_{up}]$, thereby inhibiting the ripple of three-phase switched reluctance motor torque in rotor position interval $[\theta_1, \theta_r/3]$;

(2.12) when the rotor is in a critical position and phase B torque is in excited state $S_B=0$ and excited state $S_A=-1$, total torque no longer increases but decrease; (2.2)~(2.5) are repeated from this moment and total torque is controlled in $[T_e+th1_{low}, T_e+th1_{zero}]$, thereby inhibiting ripple of three-phase switched reluctance motor torque in rotor position interval $[\theta_1, \theta_r/3]$.

* * * * *